(12) United States Patent
Giro Amigo

(10) Patent No.: US 10,302,481 B2
(45) Date of Patent: May 28, 2019

(54) BUCKET FOR TRANSPORTING AND UNLOADING PRODUCTS, ESPECIALLY FRUIT AND VEGETABLES, AND A COMBINATION WEIGHING MACHINE COMPRISING SAID BUCKETS

(71) Applicant: GIRNET INTERNACIONAL, S.L., Badalona (ES)

(72) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 135 days.

(21) Appl. No.: 15/341,107

(22) Filed: Nov. 2, 2016

(65) Prior Publication Data

US 2017/0122791 A1 May 4, 2017

(30) Foreign Application Priority Data

Nov. 2, 2015 (ES) .................................. 201531565

(51) Int. Cl.
*G01G 15/04* (2006.01)
*G01G 21/22* (2006.01)
(Continued)

(52) U.S. Cl.
CPC ............. *G01G 15/04* (2013.01); *B65G 17/36* (2013.01); *G01G 19/393* (2013.01); *G01G 21/22* (2013.01); *G01G 21/24* (2013.01); *B65G 47/38* (2013.01)

(58) Field of Classification Search
CPC ...... G01G 15/04; G01G 19/393; G01G 21/22; G01G 21/24; B65G 17/36; B65G 47/38
(Continued)

(56) References Cited

U.S. PATENT DOCUMENTS 4,152,976 A * 5/1979 Kawasaki ................ A21C 9/04
 177/120
4,426,006 A * 1/1984 Horii ......................... B07C 5/18
 177/145
(Continued)

FOREIGN PATENT DOCUMENTS

EP 0 125 902 A2 11/1984
EP 0 171 291 A2 2/1986
(Continued)

OTHER PUBLICATIONS

Communication dated Feb. 24, 2017, issued from the European Patent Office in counterpart European Application No. 16382499.8.
(Continued)

*Primary Examiner* — Natalie Huls
*Assistant Examiner* — Monica S Young
(74) *Attorney, Agent, or Firm* — Sughrue Mion, PLLC

(57) ABSTRACT

Bucket (1) for transporting and unloading products, comprising an opening at the top for receiving the products and a collapsible hinged lid (2) at the bottom of the bucket (1), the lid (2) being connected to actuation means (3 to 6) capable of moving the lid (2) between a closed and an open position for the unloading of the products by means of gravity. The lid (2) comprises at least a side support wall (2*a*) in motion with said lid (2) and positioned adjacent to an inner (1*a*) wall of the bucket (1), said support wall (2*a*) being intended to drive the products outward by means of friction during the opening motion of the lid (2), the lid (2) being actuated in a controlled manner by said actuation means (3 to 6) along its opening path and subsequent closing path.

20 Claims, 5 Drawing Sheets

(51) Int. Cl.
*G01G 21/24* (2006.01)
*B65G 17/36* (2006.01)
*G01G 19/393* (2006.01)
*B65G 47/38* (2006.01)

(58) Field of Classification Search
USPC .......................................................... 177/52
See application file for complete search history.

(56) References Cited

U.S. PATENT DOCUMENTS

| | | | | |
|---|---|---|---|---|
| 4,538,693 A | * | 9/1985 | Klopfenstein | G01G 19/393 177/112 |
| 4,609,058 A | * | 9/1986 | Sashiki | G01G 19/393 177/1 |
| 4,708,215 A | * | 11/1987 | Nakamura | G01G 13/026 177/109 |
| 6,448,511 B1 | * | 9/2002 | Dauder Guardiola | G01G 19/393 177/103 |
| 2002/0020567 A1 | * | 2/2002 | Asai | G01G 19/393 177/25.18 |

FOREIGN PATENT DOCUMENTS

| | | |
|---|---|---|
| EP | 982570 A2 * | 3/2000 |
| EP | 1176405 A2 | 1/2002 |
| ES | 1 034 791 U | 2/1997 |
| ES | 2 117 563 B1 | 3/1999 |
| ES | 2 153 749 B1 | 8/2003 |
| GB | 2 128 173 A | 4/1984 |
| JP | 2001-153714 A | 6/2001 |

OTHER PUBLICATIONS

Spanish Search Report issued in ES 201531565 dated Jun. 24, 2016.

* cited by examiner

BUCKET FOR TRANSPORTING AND UNLOADING PRODUCTS, ESPECIALLY FRUIT AND VEGETABLES, AND A COMBINATION WEIGHING MACHINE COMPRISING SAID BUCKETS

TECHNICAL FIELD OF THE INVENTION

The invention relates to a bucket for transporting and unloading products, especially fruit and vegetables, or similar products. The invention also relates to a combination weighing machine comprising said buckets.

BACKGROUND OF THE INVENTION

Currently there are known combination weighing machines comprising two parallel chain drives between which carriages are arranged, joined to the chains so that the coordinated motion of these in the same direction makes the carriages move along a closed path in which, conventionally, a horizontal straight upper feed section, a lower horizontal straight return section and certain curved sections are distinguished. Buckets are attached to these carriages, and the machines comprise a plurality of work stations distributed along the trajectory of the carriages, and by extension along the path of the buckets attached to the carriages, such as a loading station where fruit is fed into the buckets; a weighing station where the fruit contained in each bucket is weighed; and an emptying or unloading station where the buckets are emptied.

In so-called combination weighing machines, several buckets are attached to the same carriage, each carriage defining a row of buckets, and at the emptying station there is a selective emptying of those buckets, attached to the same carriage or to different carriages, whose total fruit weight is closest to a predetermined value.

Generally, the buckets are in the shape of a tub with an opening at the top for receiving fruit from the loading station, the buckets of the same row being connected to the carriage capable of rotating over a crossbar of the carriage itself.

The tilting buckets remain fastened in horizontal position throughout the entire path by means of a tilting locking lever, which is capable of being moved by an actuator element linked to the unloading station in order to carry out the dumping of the bucket.

The tilting lever with rotation capacity is mounted on a fixed point of the bucket and is in turn interconnected to the carriage by means of a tensioning spring which tends to keep said lever in a locking position, in which it remains fixed by fitting in a supportive rod of the bucket.

For unloading, as the bucket moves along its path, the corresponding actuator element contacts the upper end of the lever causing it to tilt until it disengages from the fitting stem, which in turn causes the bucket to dump and empty by gravity.

To return the bucket to horizontal position after unloading, the machine comprises a guiding ramp, located at the end of the path of the unloading station, which generates the reverse rotation of the corresponding bucket, which is then locked again by means of the tilting lever.

The machine also includes means of control that, based on data received from the weighing station and by using the appropriate software, select the combination of buckets of the same or different rows whose sum of weights is close to the predetermined weight for packaging, and sends an activation command to the actuator elements, for example movable stops, intended for swinging the respective tilting levers of those buckets that have been selected to dump, with the subsequent unloading of the fruit as it passes over the unloading station.

An example of a weighing machine of the type described above is found in patent document ES 2153749 B1.

Another example of weighing machine that also uses tilting buckets that unload by dumping is described in the patent ES 2117563 B1.

This type of tilting buckets that unload by dumping require structurally complex mechanisms in order to achieve adequate bucket motion from the horizontal locked position to the dumping position and vice versa, so they generally require a large amount of moving parts that increase manufacturing as well as maintenance costs.

It would be desirable to have a bucket that could be coupled to dynamic weighing machines, ensuring quick and easy unloading of the product contained therein over the unloading station, and that would also have a simpler and more compact structural configuration allowing for appropriate integration in the machine, and also ensuring minimal wear of its moving parts.

In other applications, there are also known buckets that include a collapsible bottom lid that, once a retention mechanism is actuated for its opening, can tilt freely through the effects of gravity allowing the emptying of the products they contain.

The nature of the products that are usually transported by buckets in a weighing machine of the type described above, such as oranges, tangerines, apples, etc., cause that this type of buckets becomes inoperative due to a disadvantage, namely, on occasions the products become trapped inside the bucket walls because of friction, and therefore cannot achieve a correct emptying or they may even fail to unload any of the product even when the bottom lid tilts freely to opening position through the effects of gravity.

In this case, it would be desirable to have a solution especially suitable for dynamic weighing machines of the type that weigh fruit and vegetables, which would ensure a proper unloading of all the products contained in the buckets of the machine during the unloading operation.

DESCRIPTION OF THE INVENTION

In order to provide a solution to the problems described above, we present a bucket for transporting and unloading products, especially intended for fruit and vegetables, comprising an opening at the top for receiving the products and a collapsible hinged lid at the bottom of the bucket, the lid being connected to actuation means capable of moving the lid between a closed and an open position for the unloading of the products by means of gravity. This bucket is characterized in that the lid comprises at least a side support wall in motion with said lid and positioned adjacent to an inner wall of the bucket, said support wall being intended to drive the products outward by means of friction during the opening motion of the lid, and in that the lid is actuated in a controlled manner by said actuation means along its opening path and subsequent closing path.

Thus, a bucket with hinged lid is obtained, which ensure quick and complete unloading of the products it contains through the effects of the side support wall that helps to expel the products contained therein during the opening motion of the lid, thus preventing them from becoming trapped inside the bucket walls because of friction.

Furthermore, since the lid is actuated throughout its opening motion, unlike other known hinged lid buckets of the state of the art, it ensures the continuous motion of the support wall and therefore the correct unloading of the products.

Advantageously, the actuation means comprise at least an articulated tilting lever capable of rotating on a turn axis of the bucket, coupled at its opposite end to the lid by mutual sliding fitting means, the lever further being stressed by resilient means.

Preferably, the mutual sliding fitting means comprise two pivots of the lid capable to be introduced respectively into two complementary slots of the lever, which act as cams for guiding the controlled motion of the lid. The slots should be opposite each other, that is, essentially directed in opposite directions.

This configuration of the actuation means of the collapsible lid enables a structurally simpler and especially more compact bucket, ensuring reduced production and maintenance costs, as well as the proper integration of the bucket in the combination weighing machine or similar machines.

The binding of the lever with two, instead of only one, pivots of the lid, allows compacting the mechanism in addition to not having to increase the necessary pair in order to push the lid in its extreme positions farthest from the fulcrum of the lever.

According to a preferred embodiment, each slot comprises an open end for receiving the respective pivot of the lid, both slots being configured and oriented so that the open end of the first slot coincides with the end of the path of the first pivot and the open end of the second slot coincides with the beginning of the path of the second pivot, so that the first pivot is capable to slide along the first slot allowing the lid to open from the initial closed position to an intermediate open position from which the second pivot is capable to slide along the second slot until the maximum opening of the lid is attained, ensuring a continuous and controlled motion of the lid along its entire path.

Thus, a guided opening of the lid is obtained at all times, from its closed position to its maximum open position, as well as throughout the reverse path in order to carry out the closing of said lid.

Additionally, the first slot includes, at the beginning of its path, a transverse notch provided for locking the first pivot in the closed position of the lid.

Advantageously, according to a variant of the invention, the resilient means are attached at one end to the bucket at a fixed point and at its other end to the lever at a mooring point, offset from the turn axis at one side thereof, the location of this mooring point being selected so that the resilient means stress the lever in the direction that enables the closing of the lid, but when the lid reaches an intermediate open position, the mooring point is placed on the other end of the turn axis, with respect to its initial location, and the same resilient means stress the lever in the opposite to initial direction, and cause the opening of the lid.

Thus, the precise arrangement of the mooring point of the resilient means on the lever ensures, on the one hand, a stable closing position because when the mooring point is arranged on one side of the turn axis of the lever, the resilient means tend to pull the lever to the closing direction of the lid and, on the other hand when the mooring point is arranged on the opposite side of said turn axis of the lever, the resilient means tend to pull the lever to the opening direction of the lid.

Preferably, the bucket comprises a fixed stop that determines the end of the path of the lever in the maximum opening position of the lid.

Advantageously, the upper end of the lever includes a projecting surface configured as a cam capable of making contact with an outer actuating element, which is able to exert a thrust force on said upper end, causing the lever to tilt in the opening direction of the lid.

Optionally, the bucket comprises abutment shoulders intended for fitting it onto an outer support element such as a carrier frame or a platform or weighing guides.

According to another aspect, the invention also relates to a combination weighing machine characterized in that it comprises a closed path transport system for the continuous movement of a plurality of buckets, as described previously, and a plurality of work stations distributed along the path followed by the buckets, including a loading station for loading the products into the buckets, a weighing station for the buckets, a selective unloading station of the products loaded in the buckets, and control means that process the weighing data and select those buckets whose sum of weight is closest to a predetermined value for unloading.

Advantageously, the selective unloading station includes an assembly of actuating elements provided for actuating the levers of those buckets that have been selected for unloading, said actuating elements being capable to be activated independently from a resting position, allowing the buckets to pass freely, to an active position in which they interfere with the trajectory of the buckets and come into contact with the upper end of the corresponding levers, as the buckets move forward, causing the tilting of said levers, which in turn start the opening motion of the collapsible lids for the unloading of the products.

Also advantageously, the selective unloading station includes, downside from the actuating elements, an assembly of locking brackets of the collapsible lids, which may come into contact with those lids that are arranged in the opening position, thus starting the closing motion of the same.

Preferably, each locking bracket comprises at least one rolling element associated with damping means intended to cushion the impact of said rolling element against the respective lids.

Preferably, each locking bracket is linked to a presence sensor, which is able to verify whether a lid is arranged in its opening position, in order to identify possible unloading failures in the buckets that have been selected.

BRIEF DESCRIPTION OF THE DRAWINGS

The accompanying drawings illustrate by way of non limiting example, a preferred embodiment of the bucket for transporting and unloading products object of the invention, and a combination weighing machine comprising said buckets. In said drawings.

DETAILED DESCRIPTION OF THE EMBODIMENT

Figure 1:
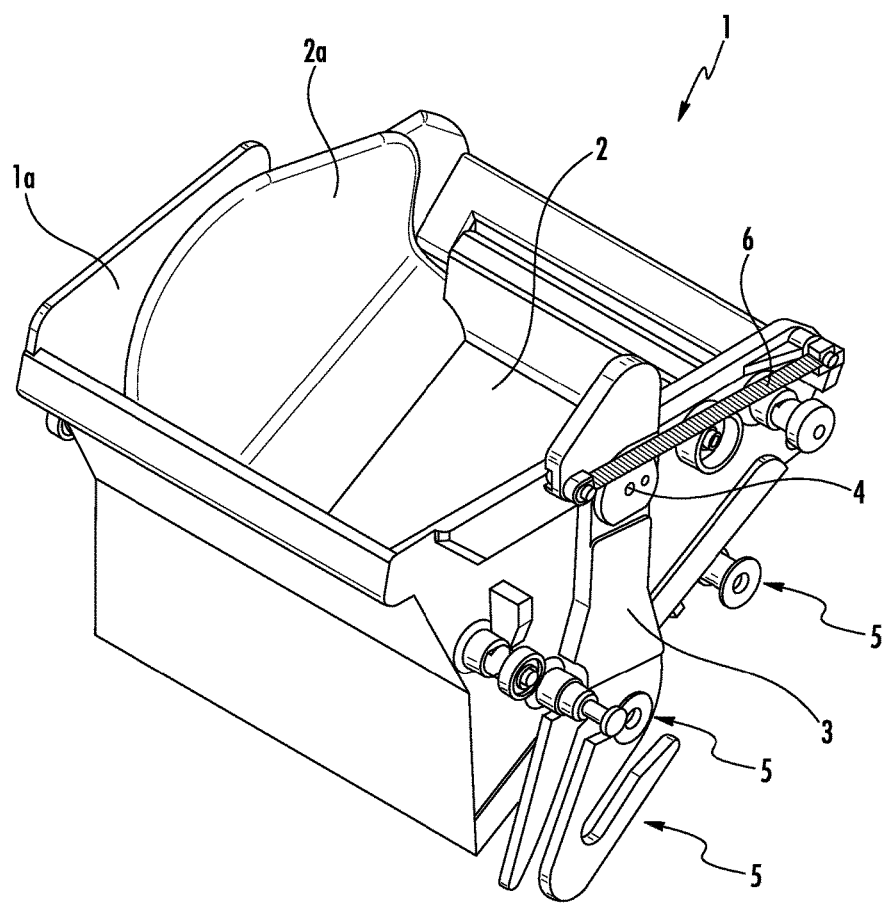
FIG. 1 is a perspective view of the bucket object of the invention with the lid in closed position.

FIG. 1 shows a bucket 1 for transporting and unloading products, especially intended for fruit and vegetables, comprising an opening at the top for receiving the products and a collapsible hinged lid 2 at the bottom of the bucket 1, the lid being connected to actuation means capable of moving the lid 2 between a closed and an open position for the unloading of the products by means of gravity.

Said means of actuation comprise an articulated tilting lever 3 with a capacity for rotation on a turn axis 4 of the bucket 1, and coupled at this opposite end to the lid 2 by mutual sliding fitting means 5, the lever 3 being stressed by resilient means 6, as explained below.

The lid 2 comprises a side support wall 2a in movement with said lid 2 and positioned adjacent to an inner wall 1a of the bucket 1, said support wall 2a being intended to drive the products outwards by friction during the opening motion of the lid 2. This way, the support wall 2a ensures quick and complete unloading of the products contained therein, thus preventing them from becoming trapped inside the bucket walls due to friction.

Furthermore, the lid 2 is actuated in a controlled manner by said actuation means throughout its opening and subsequent closing. Thus, it ensures the continuous motion of the support wall 2a allowing the proper unloading of the products.

Figure 2:
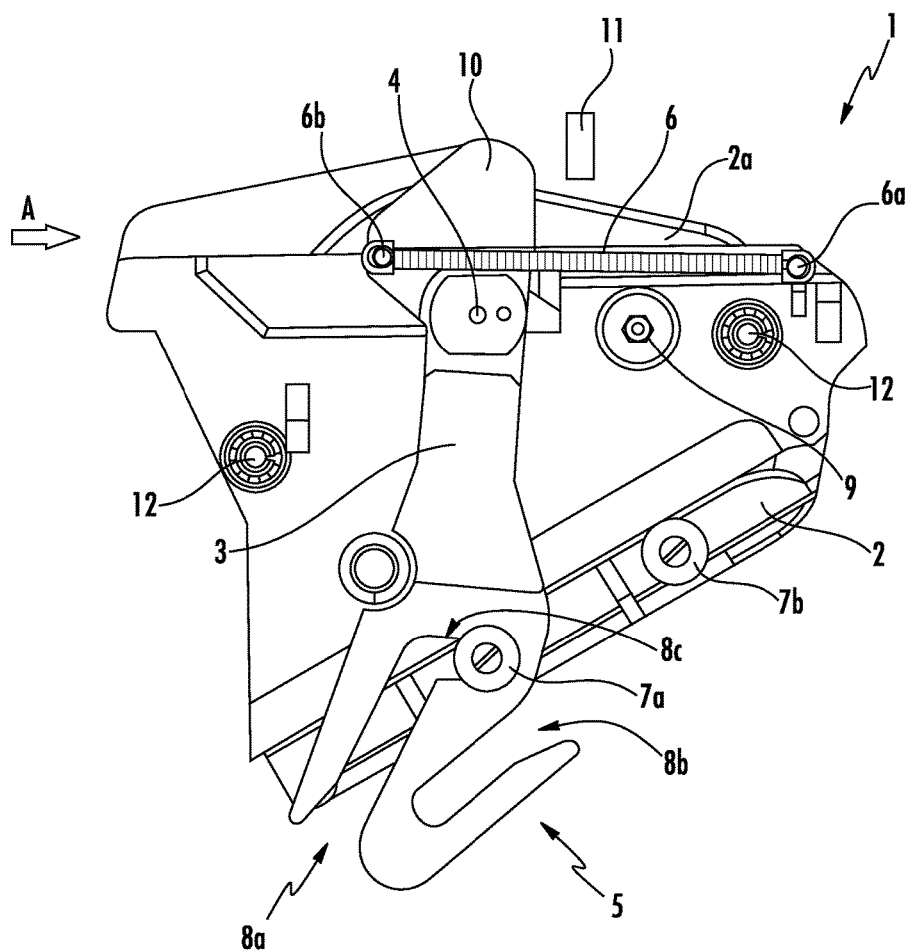
FIG. 2 is a side elevation view of the bucket object of the invention with the lid in closed position.
Figure 4:
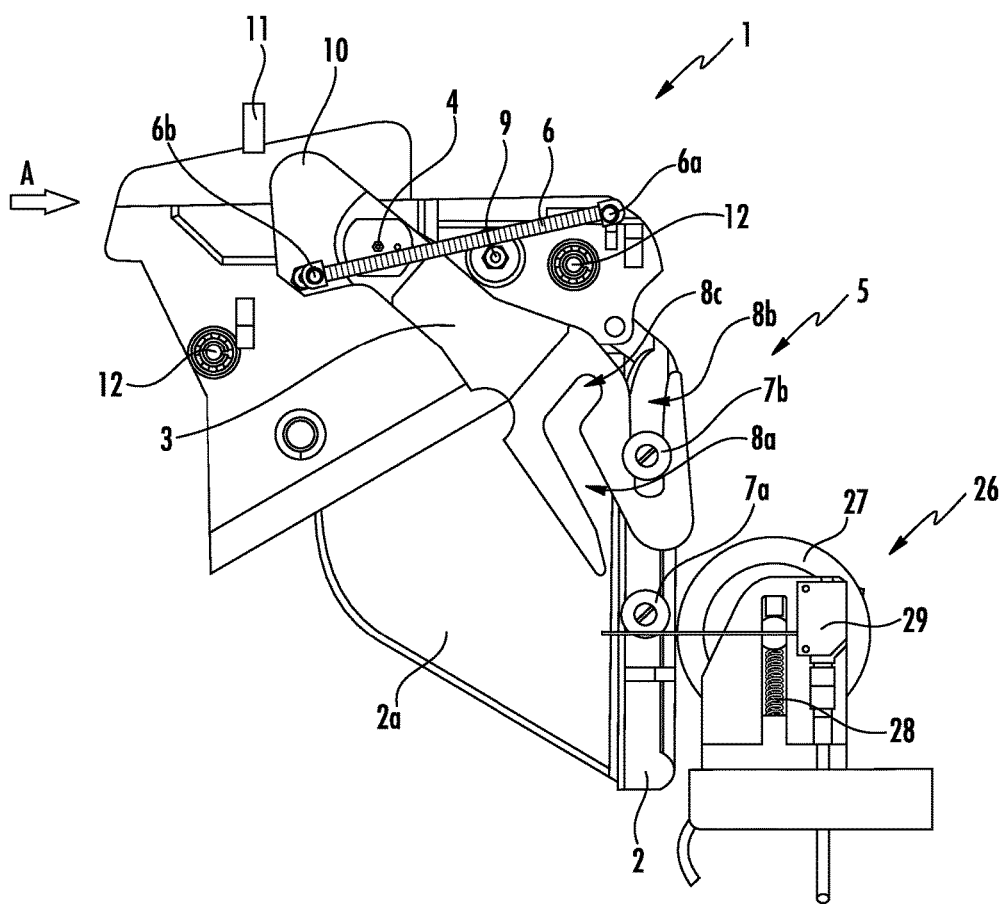
FIG. 4 is a side elevation view of the bucket object of the invention with the lid in maximum open position, and showing a locking bracket of the lids next to an open-lid presence sensor.

FIGS. 2 and 4 show the opening sequences of the lid 2 where, wherein it can be seen that the mutual sliding fitting means 5 comprise two pivots 7a, 7b of the lid 2 that may be introduced respectively into two complementary slots 8a, 8b of the lever 3, which act as cams for guiding the controlled motion of the lid 2.

Furthermore, each slot 8a, 8b comprises an open end for receiving the respective pivot 7a, 7b of the lid 2, both slots 8a, 8b being configured and oriented so that the open end of the first slot 8a coincides with the end of the path of the first pivot 7a and the open end of the second slot 8b coincides with the beginning of the path of the second pivot 7b.

Thus, the first pivot 7a has to slide along the first slot 8a during the opening maneuver of the bucket 1 allowing the lid 2 to open from the initial closed position (see FIG. 2) to an intermediate open position (see FIG. 3) from which the second pivot 7b has to slide along the second slot 8b until maximum opening of the lid 2 is attained (see FIG. 4) ensuring continuous and controlled motion of the lid 2 along its entire path as long as the lever 3 is actuated.

At the beginning of its path, the first slot 8a also includes a transverse notch 8c provided for locking the first pivot 7a in the closed position of the lid 2.

The bucket 1 also comprises a fixed stop 9 that determines the end of the path of the lever 3 in the maximum open position of the lid 2, as seen in FIG. 4.

The upper end 10 of the lever 3 includes a projecting surface configured as a cam capable of making contact with an outer actuating element 11, which is able to exert a thrust force on said upper end 10, causing the lever 3 to tilt in the opening direction of the lid 2. In this preferred embodiment, said actuating element 11 belongs to a weighing machine 20 in which an assembly of buckets 1 is mounted, as will be described below.

On the other hand, the resilient means 6, composed in this example of a helical spring, are attached at one end to the bucket 1 at a fixed point 6a and at the other end to the lever 3 at a mooring point 6b, offset from the turn axis 4 at one side thereof. In the example, the helical spring exerts traction and tends to compress.

Thus, when the mooring point 6b is found in its initial position at one side of the turn axis 4 of the lever 3 (see FIG. 2), the resilient means 6 tend to pull the lever 3 to the closing direction of the lid 2, thus ensuring a stable closing position.

On the other hand, when the lever 3 is actuated for opening, in this example by means of an actuating element 11, and once it has attained an intermediate open position (see FIG. 3), the mooring point 6b is placed on the opposite side of said turn axis 4 so that the resilient means 6 tend to pull the lever 3 to the opening direction of the lid 2 (see FIG. 4), ensuring a stable opening position. A similar maneuver will occur during the closing operation of the lid 2 so that the resilient means 6 will first tend to open the lid 2 and then close it.

Additionally, the bucket 1 comprises abutment shoulders 12 intended for fitting it onto an outer support element (not shown) such as a carrier frame or a platform or weighing guides.

Figure 5:
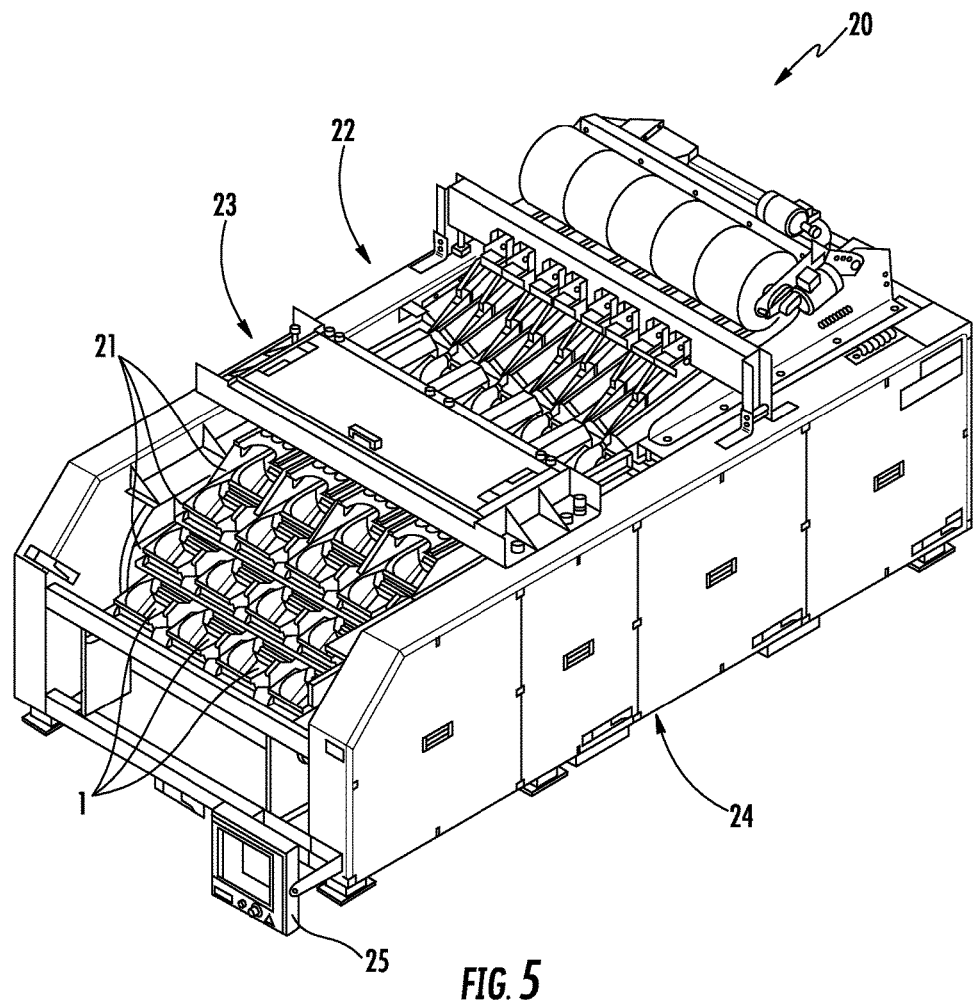
FIG. 5 is a perspective view of a combination weighing machine comprising a plurality of said buckets.

FIG. 5 shows a combination weighing machine 20 comprising a transport system that continuously moves a plurality of carriages 21 along a closed path comprising a straight upper section, a straight lower section, and certain curved linking sections between said upper and lower sections. Each carriage 21 holds several buckets 1 as described above.

The machine 20 comprises a plurality of work stations distributed along the trajectory of the buckets 1. In this embodiment, the machine 20 comprises a loading station 22 of the products into the buckets 1, a weighing station 23 of the buckets 1 arranged on the upper straight section of the trajectory followed by the carriages 21, a selective unloading station 24 (not visible in FIG. 5) of the products loaded into the buckets 1 arranged on the lower straight section, and control means 25 that process weight data and select those buckets whose sum of weights is closest to the predetermined weight for unloading.

Figure 3:
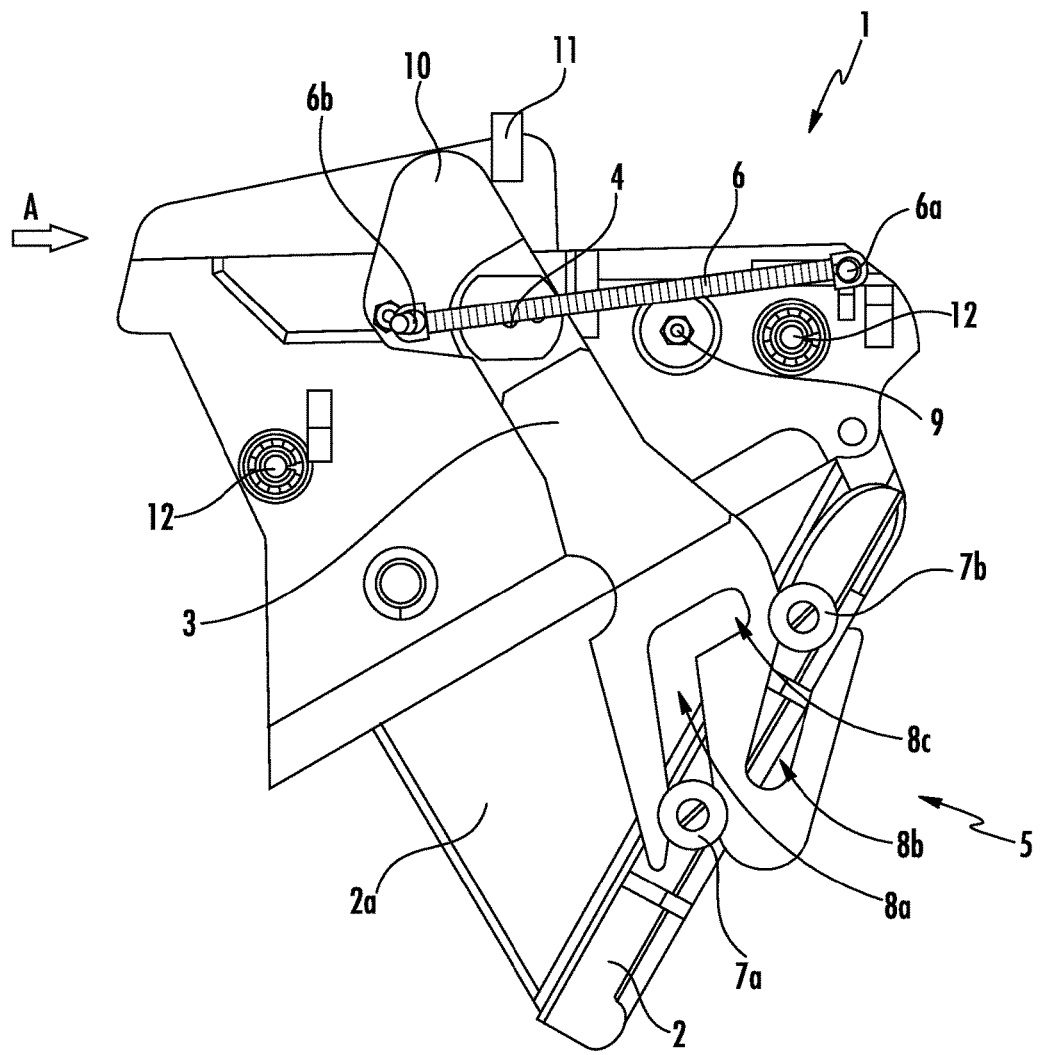
FIG. 3 is a side elevation view of the bucket object of the invention with the lid in an intermediate open position.

The motion of the buckets 1 in the machine 20 is shown in FIGS. 2 to 4 according to arrow A.

The selective unloading station 24 includes an assembly of actuating elements 11 as described previously (see FIGS. 2 to 4), provided for actuating the levers 3 of those buckets 1 that have been selected for unloading.

Said actuating elements 11 are capable of being activated independently from a resting position, allowing the buckets 1 to pass freely, to an active position in which they interfere with the trajectory of the buckets 1 and come into contact with the upper end 10 of the corresponding levers 3 as the buckets 1 move forward, causing the tilting of said levers, which in turn initially start the opening motion of the collapsible lids 2 for the unloading of the products, and then accompany the lids 2 to their maximum opening position.

Advantageously, since in the final instants of the opening maneuver of the lid 2, the resilient means 6 provide its motion up to a maximum opening position, it is not necessary that the actuating elements 11 push the lever 3 throughout the opening maneuver of the bucket 1.

Referring now to FIG. 4, the selective unloading station 24 includes, downside from the actuating elements 11, an assembly of locking brackets 26 of the collapsible lids 2, which may come into contact with those lids 2 that are arranged in the opening position, thus starting the closing motion of the same. In this example, each locking bracket 26 comprises one rolling element 27 associated with means of damping 28 intended to cushion the impact of said rolling element 27 against the respective lids 2.

Furthermore, each locking bracket 26 is linked to a presence sensor 29, which is able to verify whether a lid 2 is arranged in its opening position, in order to identify possible unloading failures in the selected buckets 1. FIG. 4 shows by means of a straight line, the trajectory of the light beam emitted by the presence sensor 29 in the moment it detects an opened lid 2.

The invention claimed is:

1. A bucket for transporting and unloading products, comprising an opening at a top of the bucket for receiving the products and a collapsible hinged lid at a bottom of the bucket, the lid being connected to actuation means for moving the lid between a closed and an open position for the unloading of the products by gravity, wherein the lid comprises at least a side support wall that moves with said lid and is positioned adjacent to an inner wall of the bucket, said support wall configured to drive the products outward by means of friction during an opening motion of the lid, and wherein the actuation means comprise at least an articulated tilting lever mounted to rotate on a turn axis of the bucket and coupled to the lid by mutual sliding fitting means, the lever biased about the turn axis by resilient means, the lid being movable in a controlled motion by said actuation means along an opening path and a subsequent closing path; and wherein the mutual sliding fitting means comprise a first pivot and a second pivot of the lid configured to be introduced respectively into a complementary first slot and a second slot of the lever, which act as cams for guiding the controlled motion of the lid.

2. The bucket according to claim 1, comprising a fixed stop that determines an end of the path of the lever at a maximum opening position of the lid.

3. The bucket, according to claim 1, wherein an upper end of the lever includes a projecting surface configured as a cam that contacts an outer actuating element, which exerts a thrust force on said upper end, causing the lever to tilt in an opening direction of the lid.

4. The bucket, according of claim 1, comprising abutment shoulders configured to fit the bucket onto an outer support element that is a carrier frame or a platform or weighing guides.

5. A combination weighing machine comprising a closed path transport system for the continuous movement of a plurality of buckets, according to claim 1, and a plurality of work stations distributed along the path followed by the buckets, including a loading station for loading the products into the buckets, a weighing station for the buckets, a selective unloading station of the products loaded in the buckets, and control means that process weight data and select those buckets whose sum of weight is closest to a predetermined value for unloading.

6. The machine, according to claim 5, wherein the selective unloading station includes an assembly of actuating elements provided for actuating the levers of those buckets that have been selected for unloading, said actuating elements configured to be activated independently from a resting position, allowing the buckets to pass freely, to an active position in which the actuating elements interfere with a trajectory of the buckets and come into contact with an upper end of the corresponding levers as the buckets move forward, causing tilting of said levers, which in turn start the opening the collapsible lids for unloading of the product.

7. The machine, according to claim 5, wherein the selective unloading station includes an assembly of locking brackets of the collapsible lids that are configured to engage the lids when in the opening position so as to initiate closing of the lids.

8. The machine, according to claim 7, wherein each locking bracket is linked to a presence sensor, which verifies whether a lid is arranged in the open position, in order to identify possible unloading failures in the buckets that have been selected.

9. A bucket for transporting and unloading products, comprising an opening at a top of the bucket for receiving the products and a collapsible hinged lid at a bottom of the bucket, the lid being connected to actuation means for moving the lid between a closed and an open position for the unloading of the products by gravity, wherein the lid comprises at least a side support wall that moves with said lid and is positioned adjacent to an inner wall of the bucket, said support wall configured to drive the products outward by means of friction during an opening motion of the lid, and wherein the actuation means comprise at least an articulated tilting lever mounted to rotate on a turn axis of the bucket and coupled to the lid by mutual sliding fitting means, the lever biased about the turn axis by resilient means, the lid being movable in a controlled motion by said actuation means along an opening path and a subsequent closing path; and wherein the resilient means are attached at one end to the bucket at a fixed point and at another other end to the lever at a mooring point, offset from the turn axis at one side thereof, a location of the mooring point being selected so that the resilient means biases the lever in an initial direction that enables closing of the lid until the lid reaches an intermediate opening position causing the mooring point to be located on another side of the turn axis so that the same resilient means biases the lever in a second direction opposite to the initial direction that enables the opening of the lid.

10. The bucket according to claim 9, comprising a fixed stop that determines an end of the path of the lever at a maximum opening position of the lid.

11. The bucket, according to claim 9, wherein an upper end of the lever includes a projecting surface configured as a cam that contacts an outer actuating element, which exerts a thrust force on said upper end, causing the lever to tilt in an opening direction of the lid.

12. The bucket according to claim 1, wherein each of the first slot and the second slot comprises an open end for receiving the respective first and second pivots of the lid, the first and second slots being configured and oriented so that the open end of the first slot coincides with an end of engagement of the first pivot with the first slot during opening of the lid and the open end of the second slot coincides with a beginning of engagement of the second pivot with the second slot during opening of the lid, so that the first pivot slides along the first slot allowing the lid to open from the closed position to an intermediate open position from which the second pivot slides along the second slot until a maximum opening of the lid is attained, ensuring continuous and controlled motion of the lid along an entire path from the closed position to the open position.

13. The bucket, according to claim 12, wherein the first slot includes, at a beginning of the opening path, a transverse notch provided for locking the first pivot in the closed position of the lid.

14. The bucket, according of claim 9, comprising abutment shoulders configured to fit the bucket onto an outer support element that is a carrier frame or a platform or weighing guides.

15. A combination weighing machine comprising a closed path transport system for the continuous movement of a plurality of buckets, according to claim 9, and a plurality of work stations distributed along the path followed by the buckets, including a loading station for loading the products into the buckets, a weighing station for the buckets, a selective unloading station of the products loaded in the buckets, and control means that process weight data and select those buckets whose sum of weight is closest to a predetermined value for unloading.

16. The machine, according to claim 15, wherein the selective unloading station includes an assembly of actuating elements provided for actuating the levers of those buckets that have been selected for unloading, said actuating elements configured to be activated independently from a resting position, allowing the buckets to pass freely, to an active position in which the actuating elements interfere with a trajectory of the buckets and come into contact with an upper end of the corresponding levers as the buckets move forward, causing tilting of said levers, which in turn start the opening the collapsible lids for unloading of the product.

17. The machine, according to claim 15, wherein the selective unloading station includes an assembly of locking brackets of the collapsible lids that are configured to engage the lids when in the opening position so as to initiate closing of the lids.

18. The machine, according to claim 17, wherein each locking bracket is linked to a presence sensor, which verifies whether a lid is arranged in the open position, in order to identify possible unloading failures in the buckets that have been selected.

19. A bucket for transporting and unloading products, comprising an opening at a top of the bucket for receiving the products and a collapsible hinged lid at a bottom of the bucket, the lid being connected to a lever that moves the lid between a closed and an open position for the unloading of the products by gravity, wherein the lid comprises a side support wall that moves with said lid and is positioned adjacent to an inner wall of the bucket, said support wall configured to drive the products outward by friction during an opening motion of the lid, and wherein the lever rotates on a turn axis of the bucket and is coupled to the lid by mutual sliding first and second pivots, the lid actively controlled to move in a controlled motion by the lever along an opening path and a subsequent closing path; and wherein the side support wall extends inside the inner wall of the bucket;

wherein the first pivot and the second pivot are configured to be introduced respectively into a complementary first slot and a second slot of the lever, which act as cams for actively guiding the controlled motion of the lid; and wherein each of the first slot and the second slot comprises an open end for receiving the respective first and second pivots of the lid, the first and second slots being configured and oriented so that the open end of the first slot coincides with an end of engagement of the first pivot with the first slot during opening of the lid and the open end of the second slot coincides with a beginning of engagement of the second pivot with the second slot during opening of the lid, so that the first pivot slides along the first slot allowing the lid to open from the closed position to an intermediate open position and the second pivot slides along the second slot until a maximum opening of the lid is attained, ensuring continuous and controlled motion of the lid along an entire path from the closed position to the open position.

20. The bucket, according to claim 19, wherein the side support wall overlaps the inner wall of the bucket when the lid is in a maximum opened position.

\* \* \* \* \*